(12) United States Patent
Rydnell et al.

(10) Patent No.: US 8,095,109 B2
(45) Date of Patent: Jan. 10, 2012

(54) CHARGING OF GPRS TRAFFIC FOR ROAMING MOBILES BY PERFORMING TRAFFIC COUNTING AT THE USER TERMINAL

(75) Inventors: Gunnar Rydnell, V Frölunda (SE); Stefan Axelsson, Sävedalen (SE); Lars Lövsén, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 571 days.

(21) Appl. No.: 12/307,458

(22) PCT Filed: Jul. 4, 2006

(86) PCT No.: PCT/EP2006/006491
§ 371 (c)(1),
(2), (4) Date: Jan. 5, 2009

(87) PCT Pub. No.: WO2008/003337
PCT Pub. Date: Jan. 10, 2008

(65) Prior Publication Data
US 2009/0291666 A1      Nov. 26, 2009

(51) Int. Cl.
*H04M 11/00* (2006.01)
*H04M 1/66* (2006.01)
*H04M 1/68* (2006.01)

(52) U.S. Cl. ........ 455/406; 455/405; 455/407; 455/408; 455/410; 455/411

(58) Field of Classification Search .................. 455/407, 455/408, 410, 411, 405, 406
See application file for complete search history.

(56) References Cited

U.S. PATENT DOCUMENTS

| 6,332,579 | B1 | 12/2001 | Ritter | |
| 2001/0021651 | A1* | 9/2001 | Burgaleta-Salinas et al. | 455/433 |

FOREIGN PATENT DOCUMENTS

WO    WO 2005111878 A    11/2005

* cited by examiner

*Primary Examiner* — Marisol Figueroa
(74) *Attorney, Agent, or Firm* — Roger S. Burleigh

(57) ABSTRACT

The application relates to charging of traffic from terminals and in particular of charging of traffic from GPRS mobile terminals which are roaming in a visited PLMN (not claimed). According to the applicant's acknowledged prior art, either the traffic passes the home PLMN or the Home Operator relies on the Visited Operator to generate the CDRs to be used by the Home Operator for billing. Whereas the first solution leads to tromboning and inefficient traffic routing, the second solution calls for a strong trust relationship between the Home and the Visited Operators. The present invention circumvents both problems in that the terminal generates a traffic counting information and sends it to the Visited Network. The Visited Network generates a traffic counting record comprising the traffic counting information from the terminal and traffic counting information from the Visited Network. The traffic counting record is subsequently sent to the Home Network.

7 Claims, 5 Drawing Sheets

CHARGING OF GPRS TRAFFIC FOR ROAMING MOBILES BY PERFORMING TRAFFIC COUNTING AT THE USER TERMINAL

TECHNICAL FIELD

The present invention relates to secure charging of 3GPP GPRS mobiles and in particular to mobiles roaming in an external public land mobile network (PLMN).

BACKGROUND OF THE INVENTION

In 3GPP there is an initiative ongoing to define next generation architecture for PS based services. This work goes under the work item, SAE (System Architecture Evolution). In this context a new architecture for mobile networks is discussed. The work is focused on a simplified and more cost effective architecture, such that fewer nodes are needed in the network. The focus is also on more effective protocols and support for services that have higher performance requirements. Less delays and higher throughput are important issues. Excessive delays are present when traffic needs to be routed ineffectively e.g. via a Home network while the user is roaming in a visited PLMN (VPLMN).

The routing via Home network is called tromboning effect and is well known from the CS (circuit switched) domain, where telephone calls may be routed from a VPLMN, through the HPLMN (Home PLMN) to the B party end user. There may e.g. be cases for VoIP (Voice over IP) and IMS (IP multimedia subsystems) where a call is made to a peer user who is present in the same VPLMN as the calling user, but the traffic has to be sent via IMS and the GGSN in the HPLMN. It is not optimal.

Roaming users are billed by the Home operator. When the GPRS user is roaming, the SGSN in the VPLMN will perform traffic measurements and counting the amount of traffic that is handled. The traffic reports are sent to the Home Operator as CDR's (Charging Data Records) for accounting between the operators. In the current solution the traffic also passes the HPLMN, where the Home Operator generates his own CDR's, and there is a double check that the traffic charges that the Visited Operator claims from the Home Operator (and also the billing of the user) are correct.

The currently existing 3GPP specified GPRS architecture is well designed for PS (Packet Switched) applications with moderate requirements for latency, but not so for delay sensitive real time applications such as VoIP or gaming. For these types of applications the Home routing (tromboning) may be a problem.

A solution to the routing problem and the trombone effect would be the so called local breakout method (or optimal routing in the CS domain), instead of routing the PS traffic from the VPLMN, through the HPLMN and the Home GGSN and out to Internet or to an other network, the traffic is sent directly to the external network or the service network from the VPLMN, see route A in FIG. 1.

However, the local breakout method may be attractive from a traffic plane consideration, but from the control plane point of view there are less attractive effects. A new problem appears. When the traffic is routed directly out from the VPLMN, there are no control plane activities possible in the HPLMN. The Home Operator will not be able to do traffic metering or any control of the traffic flow. However, the Home Operator will still have to bill the user, but in this case based entirely on CDR's generated by the Visited Operator. The Home Operator will have no means of checking upon the claims of the Visited Operator. These circumstances call for a strong trust relationship between the Home and the Visited Operators.

Without solving the billing trust problem, the local breakout method may not be allowed by the operators.

SUMMARY OF THE INVENTION

In order to solve the trust problem between the different players in the local break out service provision for roaming mobile users, it is an object of the present invention to introduce a novel way of counting traffic and reporting remedying some of the problems involved with the known solutions. This is done in several ways in which a first aspect a method for a executing a financial transaction in a wireless communication network is provided, comprising the steps of:

receiving in a support node in a visited public land mobile network (VPLMN), traffic counting information with a digital signature from a user equipment (UE);

generating in the VPLMN a traffic counting record (15), with traffic counting information from the UE together with the digital signature and with traffic counting information from the VPLMN; and sending the traffic counting record to a home public land mobile network (HPLMN) device.

The method may further include a step of comparing traffic counting information from the UE with traffic counting information from the VPLMN device.

The method may even further include a step of reacting to differences between UE traffic counting information and VPLMN traffic counting information.

The digital signature may be encrypted.

The traffic counting information may comprise information about at least one of traffic volume, time of duration, time of connection, time of disconnection, number of data packets, uplink/Downlink, PDP Context, IP address, per application (e.g. email, gaming, Voice over Internet Protocol (VoIP), or browsing), and APN (Access Point).

The VPLMN device may be arranged to use the method only when a local breakout session is used. The method may further comprise a step of comparing traffic counting information with pre paid information data.

Another aspect of the present invention, an infrastructure network is provided comprising an infrastructure device for performing the above method.

Yet another aspect of the present invention, a user equipment is provided comprising a processor arranged to count traffic information and arranged to send traffic information together with a digital signature to a visited public land mobile network (VPLMN).

The user may further be arranged to use at least one of Federal Information Processing standard (FIPS186), Federal Information Processing Standard (FIPS186) Digital Signature Standard (DSS), Full Domain Hash, RSA-PSS (Probabilistic Signature Scheme) based on RSA, DSA (Digital Signature Algorithm), ECDSA (Elliptic Curve DSA), ElGamal signature scheme, Undeniable signature, or SHA (Secure Hash Algorithm) with RSA for generating the signature.

Still another aspect of the present invention, a home location accounting server is provided comprising a processing device arranged to receive traffic counting Records, with combined traffic counting information from a user equipment (UE) with a digital signature and counting information from a visited public land mobile network VPLMN).

The processing device may further be arranged to use at least one of Federal Information Processing standard (FIPS186), Federal Information Processing Standard (FIPS186) Digital Signature Standard (DSS), Full Domain Hash, RSA-PSS (Probabilistic Signature Scheme) based on RSA, DSA (Digital Signature Algorithm), ECDSA (Elliptic Curve DSA), ElGamal signature scheme, Undeniable signature, or SHA (Secure Hash Algorithm) with RSA for controlling the authenticity of the digital signature.

Another aspect of the present invention, a support node is provided in a mobile communication infrastructure for generating a charging record, comprising an arrangement for:
- receiving traffic counting information with a digital signature from a user equipment (UE);
- generating a traffic counting record, with traffic counting information from the UE together with the digital signature and with traffic counting information from the support node; and
- sending the traffic counting record to a home public land mobile network (HPLMN).

The present invention this provide a solution for allowing local breakout which may be accepted by operators; both a users home operator and operators handling networks in which the user is visiting can accept the solution since it is possible to control the traffic counting information at several points and comparing these to each other. Communication traffic does not need to be routed through the home network but can instead be short cut to another user equipment directly in contact with the visited network thus reducing the amount traffic in the communication infrastructure networks needed. Another advantage is that the visited operator can control the traffic counting information from the user equipment in real time and take appropriate action quickly if any fraud attempts are discovered. The invention is also compatible with both accounting and pre paid communication protocols.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
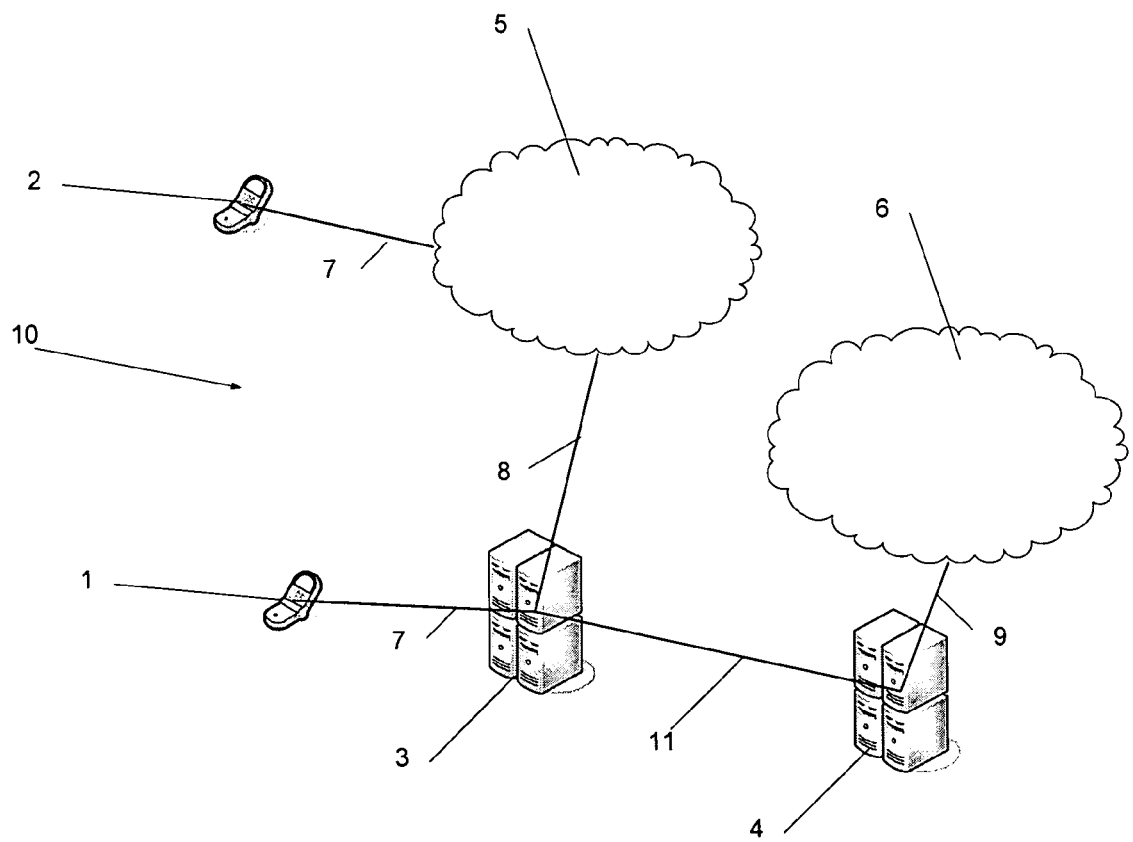
FIG. 1 illustrates schematically a local breakout architecture.

In FIG. 1 reference numeral 10 generally indicate a communication network for which the present invention operates within. A user equipment (UE) is connected to a visiting public land mobile network (VPLMN) 3 away from a home public land mobile network (HPLMN) 4. The present invention relates to a situation where the visiting UE 1 communicates with another UE 2 and instead of communicating with the HPLMN 4 of the visiting UE 1 one would be interested in communicating directly via the VPLMN 3 in order to reduce traffic routing between different network components. The network 10 further comprises communication links 7 between the UE 1, 2 and infrastructure communication link 11 between the VPLMN 3 and HPLMN 4. The VPLMN 3 and HPLMN 4 may be connected to respective communication networks 5 and 6 with respective communication links 8 and 9.

The Home Operator needs to get some way of checking that reporting from the Visited Operator is correct or at least made plausible. One way of providing this function is to involve the UE 1 (User Equipment, e.g. a mobile phone) in the traffic counting, since all outgoing traffic is initiated from the UE 1. This can be done in different ways, in principle it would be enough to let the UE 1 in full control of counting traffic alone without requiring any counting in the network 10. However, this method is not secure, since there will be an incentive for a user of the user equipment 1 to tamper with the traffic counting algorithm in order to get free or reduced cost service.

A more realistic method is to let both the UE land the VPLMN 3 operator count traffic volumes. Based on the counted values, the UE 1 generates a secure traffic report, which is sent to the network. The secure report shall be periodically generated, e.g. each time a traffic volume limit is passed, at regular time intervals, or by polling from the HPLMN 4 operator system. The secure report shall be sent to the Home operator via the Visited Operator. The secure traffic report is signalled to the Visited operator, which shall insert it in the VPLMN traffic counting information, e.g. as CDR's (Charging Data Records) and send it to the Home operator, i.e. the Visited Operator will append the secure report from the UE 1 to the CDR produced by the Visited Operator system 3 forming a report comprising both UE 1 traffic counting information and VPLMN 3 traffic counting information. Thus, when the CDR's are received by the Home operator 4, there will be traffic counting information in the CDR both from the Visited Operator 3, and also from the UE 1. In this way the Home Operator can double check the two values against each other. In order for the Visited Operator 3 not to manipulate the UE 1 generated secure traffic report, it needs to be protected by some suitable means, for instance a digital signature, encrypted data, or some other method for reducing the risk of tampering. Other traffic counting information structures may be used than CDR's.

The advantage of generating traffic reports both from the UE 1 and from the VPLMN 3 is that the incentive to fake the traffic reports drives the reported values in different directions: the UE 1 benefits from low counts while the VPLMN 3 operator benefits from high counts. This circumstance ensures an effective means for the HPLMN 4 operator of double checking the reports and that the end user and the VPLMN 3 operator do not cooperate in criminal activities.

Figure 2:
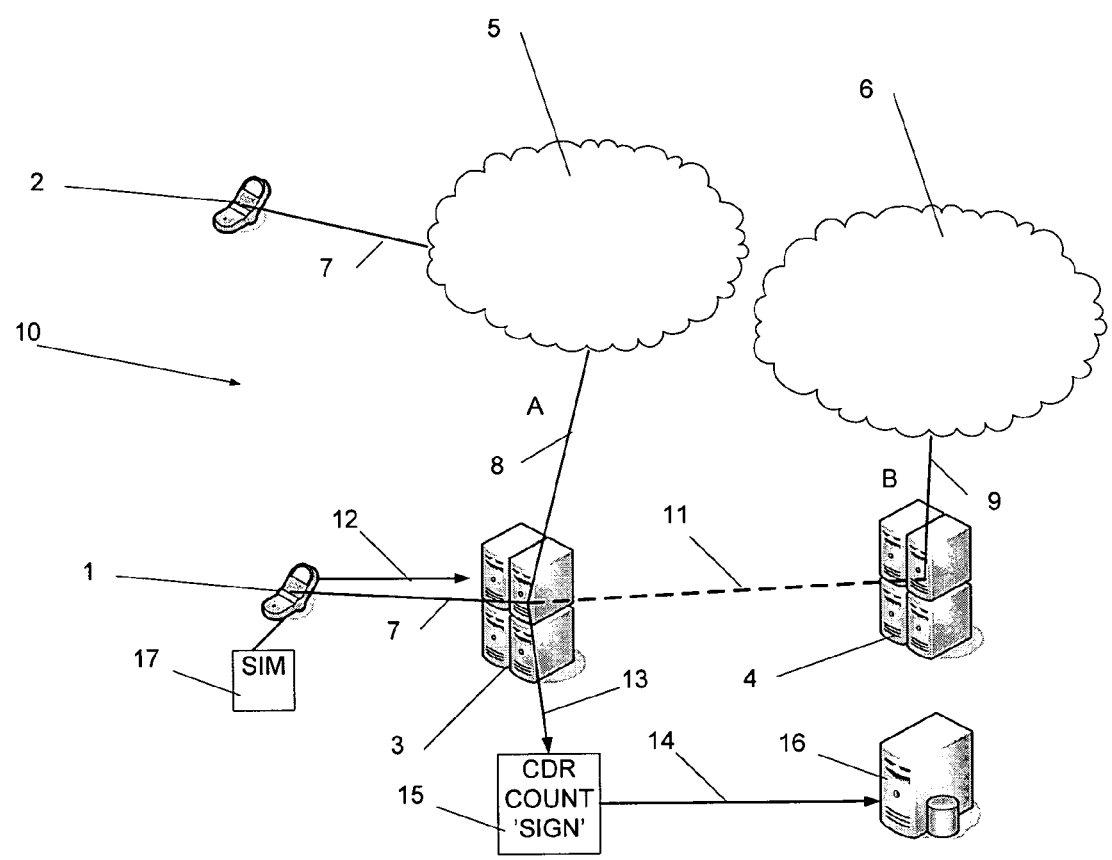
FIG. 2 illustrates schematically local breakout and enhanced billing architecture.

FIG. 2 shows a local breakout and enhanced billing architecture according to the present invention. Traffic between the visiting UE 1 and the other UE 2 is sent on a local breakout path A 8, without passing the Home PLMN 4.

The UE 1 has software SW that is able to count traffic volumes that pass through it, with an arbitrary accuracy and granularity, and at some trigger point, with the help of a SIM (Subscriber Identity Module) 17 attached to the UE 1, generate a cryptographic digital signature, 'SIGN' with the traffic counting information, which is sent 12 together with the traffic report, to the network, i.e. for instance to the VPLMN 3 or directly to the HPLMN 4.

The Visited network 3 has the ability to catch the new information element, traffic report and 'SIGN', and insert it in the next CDR 15 produced 13 by the VPLMN 3 that is sent 14 for the UE 1 to the Home Operator, for instance to a Home Operators billing system 16 or a billing agent acting as an intermediate communication broker.

The Home Operator billing system 16 can decipher the information traffic report and 'SIGN' and use it to validate the correctness of the counted bytes that the Visited Network has reported.

Figure 3:
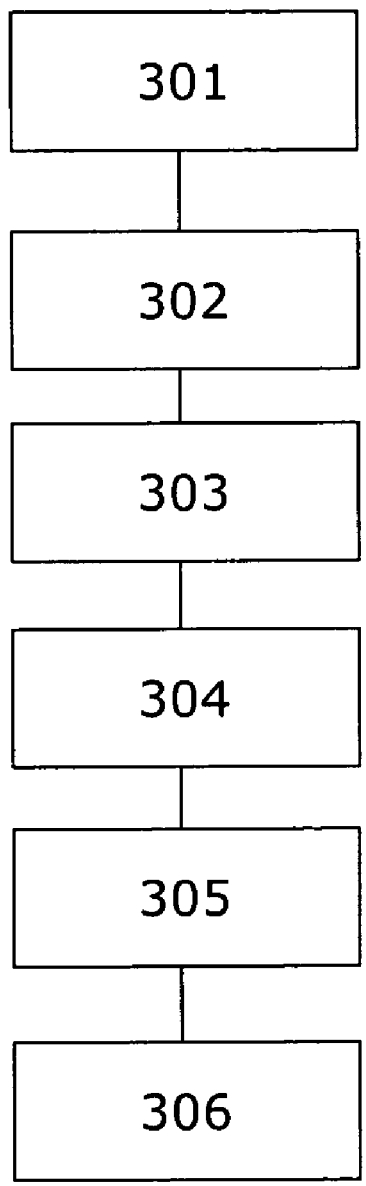
FIG. 3 illustrates schematically in a block diagram a method according to the present invention.

A method according to the invention is illustrated in FIG. 3, wherein the following steps are shown:

301. The UE 1 generates a digital signature ('SIGN') with traffic counting information and sends it with the UE generated traffic report to the Visited Network;
302. The Visited network counts the traffic to the UE 1;
303. When the Visited Network generates a CDR 15, it inserts the 'SIGN' together with traffic count generated by the UE 1 and the report generated by the VPLMN 3;
304. The CDR 15 is sent to the Home operators billing system 16;
305. The Home Operator billing system 16, checks the validity of the traffic count report from the VPLMN 3 with the help of the 'SIGN' and the UE 1 generated traffic report; and
306. The Home Operator bills the user.

The UE 1 counts all traffic that passes it, uplink and downlink. At certain home operator defined trigger points, which could be volume based, time based, or polled, the UE 1 calculates a traffic report. Time based counting may comprise time duration, time of connection, and/time of disconnection. The report may comprise just one aggregate sum of volume, or can be divided in counts with higher granularity, such as per uplink/Downlink, per PDP Context, per IP address, per application (e.g. email, gaming, VoIP, or browsing), per APN (Access Point) etc. With the use of the per APN counting, it is possible for the Visited Operator to see exactly which amount of traffic that the user has counted as passing through the Visited operator APN. Based on the traffic report, a digital signature, 'SIGN', is calculated with the help of for instance a SIM card or some other unique identifier that is reasonably un-tamper able. The digital signature may be encrypted in any suitable manner as understood by the person skilled in the art. A suitable digital signature scheme may be including but not limited to Federal Information Processing standard (FIPS186), Federal Information Processing Standard (FIPS186) Digital Signature Standard (DSS), Full Domain Hash, RSA-PSS (Probabilistic Signature Scheme) based on RSA, DSA (Digital Signature Algorithm), ECDSA (Elliptic Curve DSA), ElGamal signature scheme, Undeniable signature, or SHA (Secure Hash Algorithm) (typically SHA-1) with RSA. The digital signature is protecting the traffic report, such that the 'SIGN' shows if the traffic report has been changed.

The digital signature is also an authentication, showing that the report is authentically generated by the correct UE 1. This is used by the HPLMN 4 to see that it is not a fake UE 1 trying to influence the billing system 16.

The traffic report and the digital signature are sent to the VPLMN 3 with a request to be included in the next CDR 15 generated by the VPLMN 3 and sent to the HPLMN 4.

The Visited network 4 must catch the UE 1 generated traffic report and the 'SIGN' and insert it in the CDR 15. The CDR 3 is sent to the HPLMN 4 for accounting and reporting. With FBC/PCC (Flow Based Charging/Policy Control and Charging) it may be possible to indicate to the VPLMN 3 to do null counting of certain service flows that are not charged by the VPLMN 3. However, for reporting purposes, all traffic should be counted and reported to the HPLMN 4, even if not charged.

With the method of an UE 1 generated traffic report sent in open and protected by a signature, the VPLMN 3 can read the report without being able to change it. Then, the VPLMN 3 can verify that the report sent by the UE 1 coincides with its own traffic counting. If there is a discrepancy detected, the VPLMN 3 can immediately take actions, e.g. bar the fraudulent UE 1 from accessing the network. This is also an advantage for the VPLMN 3 operator: The UE 1 generated traffic report may be sent to the HPLMN 4 in different ways. The advantage of sending it via the VPLMN 3 has been shown above, but it is nevertheless possible that there may be benefits using other methods, e.g. the HPLMN 4 could extract, independently of the VPLMN 3, the report directly from the UE 1. In any case it is important to let the network (NW) decide on reporting method. This can be done for the VPLMN 3, by using a flag sent from the VPLMN 3 to the UE 1, indicating if the VPLMN 3 requires the UE 1 report or not.

The Home PLMN billing system 16 receives a continuous stream of UE 1 generated digital signature protected traffic reports during the time that the UE 1 is in the Home PLMN 4, as well as during periods of roaming using some suitable interconnection protocol, for instance AAA protocols (authentication, authorization and accounting) such as Radius or Diameter protocols or any other standard or proprietary protocol. By comparing the UE generated report and the VPLMN generated CDR, the Home PLMN billing system 16 may be able to correlate the traffic counting in the UE 1 with the traffic counting in the Home NW and with the traffic counting in the Visited NW and with the help of timestamps included in the traffic reports. It should then be possible to detect any discontinuities or irregularities in the Visited Operator counting (given that the Home Operator can trust the UE 1 digital signature protected counting).

The billing trust problem may be sufficiently severe that the technically more attractive local break out method may be put aside, and less attractive solutions will be specified in SAE in 3GPP. The present invention ensures that operators can trust each other for accounting for roaming mobiles, even in the case of local break out, and that the best technical choices are made.

Figure 4:
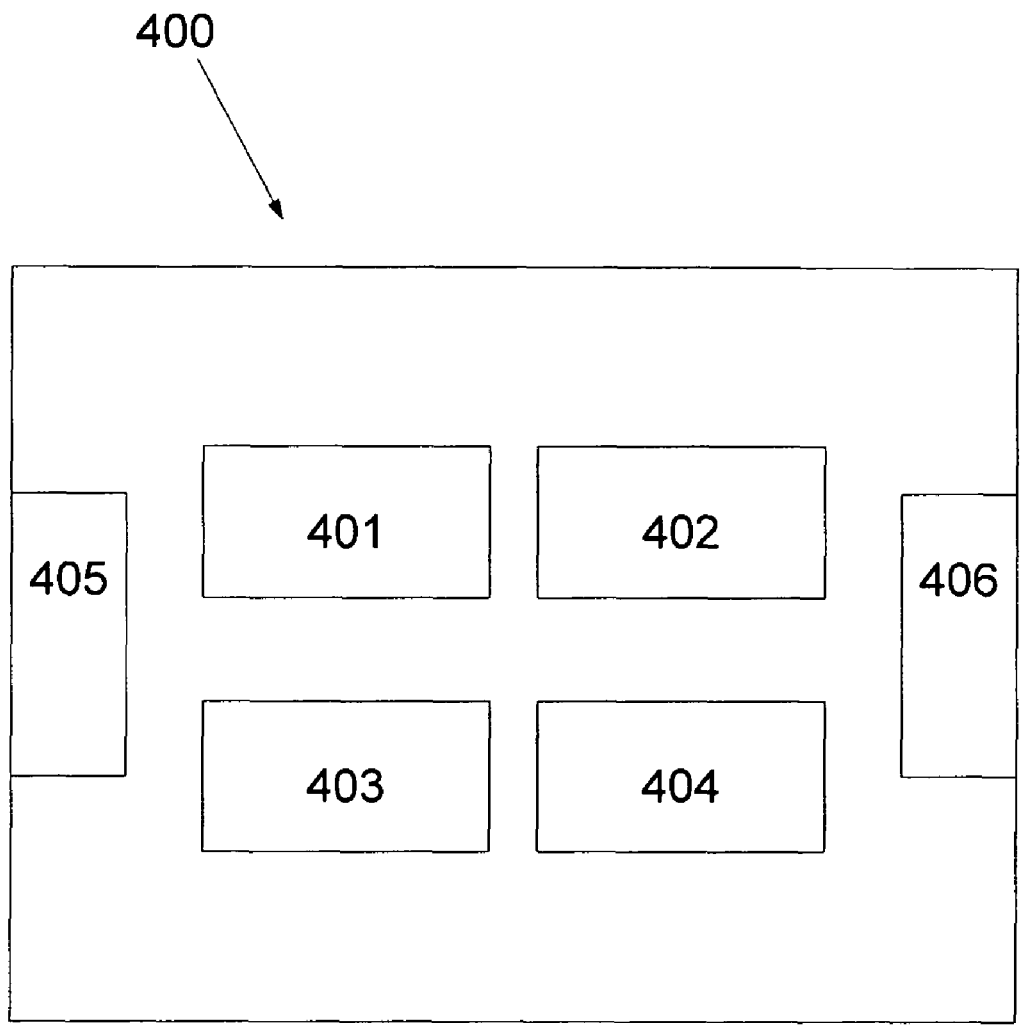
FIG. 4 illustrates schematically in a block diagram an infrastructure node according to the present invention.

Turning now to FIG. 4, illustrating in a schematic block diagram an infrastructure node according to the present invention (e.g. a support node), wherein a processing unit 401 handles communication data and communication control information. The infrastructure node 400 further comprises a volatile (e.g. RAM) 402 and/or non volatile memory (e.g. a hard disk or flash disk) 403, an interface unit 404. The infrastructure node 400 may further comprise a mobile communication unit 405 and backbone communication unit 406, each with a respective connecting interface. All units in the infrastructure node can communicate with each other directly or indirectly through the processing unit 401. Software for handling communication to and from the mobile units attached to the network is at least partly executed in this node and may be stored in the node as well; however, the software may also be dynamically loaded upon start of the node or at a later stage during for instance a service interval. The software can be implemented as a computer program product and distributed on a removable computer readable media, e.g. diskette, CD-ROM (Compact Disk-Read Only Memory), DVD (Digital Video Disk), flash or similar removable memory media (e.g. compactflash, SD secure digital, memorystick, miniSD, MMC multimediacard, smartmedia, transflash, XD), HD-DVD (High Definition DVD), or Bluray DVD, USB (Universal Serial Bus) based removable memory media, magnetic tape media, optical storage media, magneto-optical media, bubble memory, or distributed as a propagated signal via a computer network (e.g. Internet, a Local Area Network (LAN), or similar networks).

Figure 5:
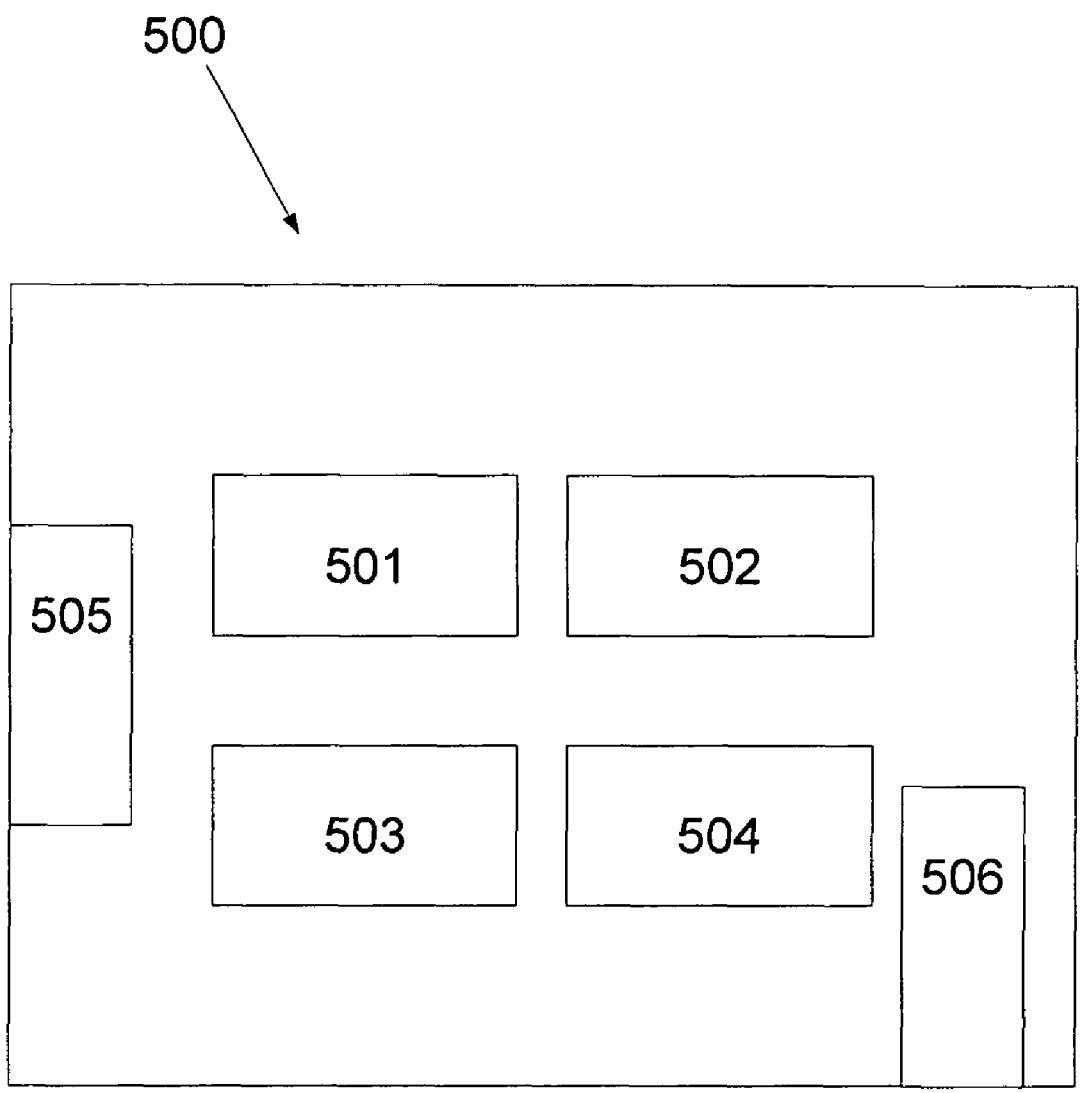
FIG. 5 illustrates schematically in a block diagram a user equipment according to the present invention.

FIG. 5 illustrates in a schematic block diagram a user equipment (UE) according to the present invention, wherein a processing unit 501 handles communication data and communication control information. The UE 500 further comprises a volatile (e.g. RAM) 502 and/or non volatile memory (e.g. a hard disk or flash disk) 503, an interface unit 504. The UE 500 may further comprise a mobile communication unit 505 with a respective connecting interface. All units in the UE can communicate with each other directly or indirectly through the processing unit 501. Software for implementing the method according to the present invention may be executed within the UE 500. The UE 500 may also comprise an interface 506 for communicating with an identification unit, such as a SIM card, for uniquely identifying the UE in a network and for use in the identification of the 'SIGN' (i.e. traffic counting and digital signature of the UE). Other features often present in UE are not shown in FIG. 5 but should be understood by the person skilled in the art, e.g. for a mobile phone: antenna, camera, replaceable memory, screen and buttons.

It should be noted that even though CDR analysis is often performed off line at a later stage they may be conducted in real time (so called on line charging). For instance different forms of pre paid functionality may be implemented together with the present invention, for instance by using a Gy interface for distribution of credit for online charging. However, for a system involving an FBC (Flow Based Charging) method with an SGSN or GGSN node than pre paid traffic information is referred to as "buckets" rather than CDR's as understood by the person skilled in the art. A VPLMN or HPLMN system may be arranged to compare traffic information data with pre paid information data for allowing the UE to communicate as long as there are credit in the pre paid data left.

It should further be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

DEFINITIONS

GGSN Gateway GPRS support Node
GSN GPRS support Node
IE Information Element
SGSN Serving GPRS Support Node
UE User Equipment

The invention claimed is:

1. A method for a executing a financial transaction in a wireless communication network, comprising the steps of:
   receiving, in a support node of a visited public land mobile network (VPLMN), traffic counting information with a digital signature from a user equipment (UE);
   generating, in the VPLMN support node, a traffic counting record with traffic counting information from the UE together with the digital signature and with traffic counting information from the VPLMN support node;
   sending the traffic counting record to a home public land mobile network (HPLMN) device;
   comparing traffic counting information from the UE with traffic counting information from the VPLMN support node; and
   reacting to differences between the UE traffic counting information and the VPLMN traffic counting information.

2. The method according to claim 1, wherein the digital signature is encrypted.

3. The method according to claim 1, wherein the traffic counting information comprises information about at least one of traffic volume, time of duration, time of connection, time of disconnection, number of data packets, uplink/Downlink, PDP Context, IP address, per application (e.g., email, gaming, Voice over Internet Protocol (VoIP), or browsing), and APN (Access Point).

4. The method according to claim 1, wherein the VPLMN support node is configured to use the method only when a local breakout session is used.

5. The method according to claim 1, further comprising a step of comparing traffic counting information with pre-paid information data.

6. An infrastructure network comprising an infrastructure device for performing the method according to claim 1.

7. A support node of a visited public land mobile network (VPLMN) for generating a charging record, comprising:
   a mobile communication unit for receiving traffic counting information with a digital signature from a user equipment (UE);
   a processing unit for generating a traffic counting record, with traffic counting information from the UE together with the digital signature and with traffic counting information from the support node; and,
   a backbone communication unit for sending the traffic counting record to a home public land mobile network (HPLMN);
   wherein traffic counting information from the UE is compared with traffic counting information from the support node; and wherein the HPLMN reacts to differences between traffic counting information from the UE and traffic counting information from the support node.

* * * * *